May 15, 1951      S. MANN      2,553,462
SIGNAL SYSTEM FOR VEHICLES

Filed Dec. 13, 1949      4 Sheets-Sheet 1

Inventor

Stiles Mann

Clarence A. O'Brien
and Harvey B. Jacobson
Attorneys

May 15, 1951 — S. MANN — 2,553,462
SIGNAL SYSTEM FOR VEHICLES
Filed Dec. 13, 1949 — 4 Sheets-Sheet 2
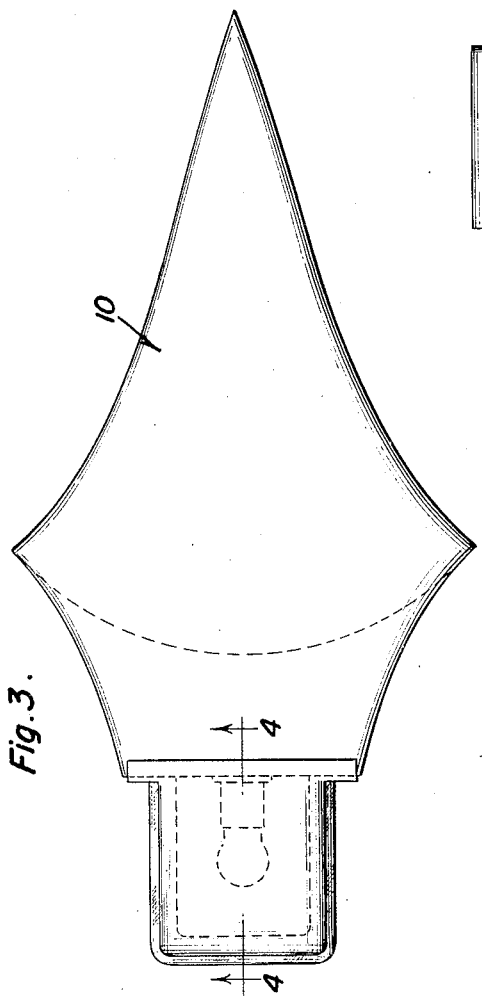
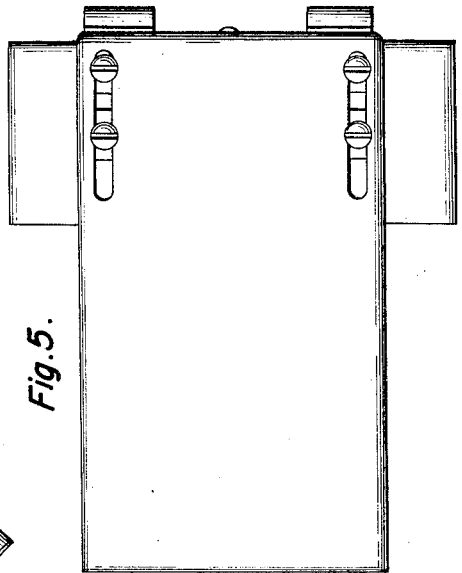
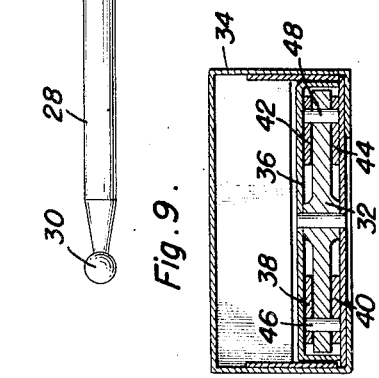
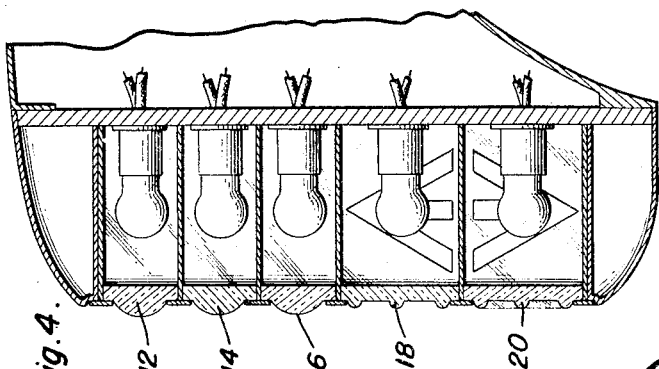
Inventor
Stiles Mann May 15, 1951  S. MANN  2,553,462
SIGNAL SYSTEM FOR VEHICLES
Filed Dec. 13, 1949  4 Sheets-Sheet 3
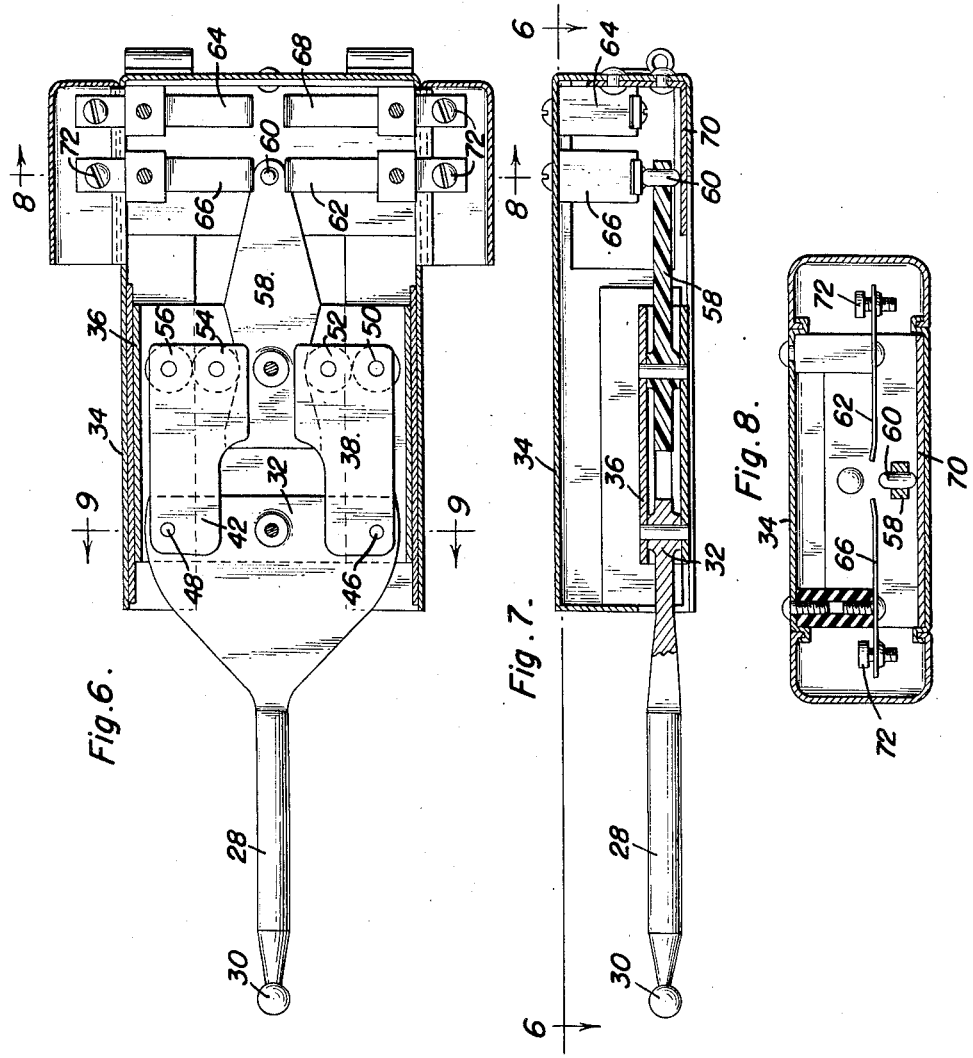
Inventor
Stiles Mann May 15, 1951         S. MANN         2,553,462
SIGNAL SYSTEM FOR VEHICLES
Filed Dec. 13, 1949         4 Sheets-Sheet 4

Inventor
Stiles Mann

Patented May 15, 1951

2,553,462

UNITED STATES PATENT OFFICE 2,553,462

SIGNAL SYSTEM FOR VEHICLES

Stiles Mann, Dunnegan, Mo.

Application December 13, 1949, Serial No. 132,749

5 Claims. (Cl. 200—59)

This invention relates to a signal system for an automotive vehicle, and more specifically to a circuit closing mechanism adapted to be associated with the gear shifting lever of an automotive vehicle for operating a signal system.

The primary object of the invention is to provide a circuit closing mechanism for operating a signal system comprising lamps preferably located on the front and rear of an automotive vehicle, whereby a motorist approaching the vehicle can be informed whether the automobile is moving or at a standstill, and, if moving whether in a forward or backward direction, whether the automobile is in gear or not and whether or not it is in high or in an intermediate gear.

A further object of the invention is to provide a signal system that is selectively operated in response to the position of a gear shift lever of the automotive vehicle.

Yet another object of the invention resides in the provision of a series of colored lights for use in warning an approaching motorist of the operative condition of another vehicle.

These, together with the various ancillary objects of the invention which will become apparent as the following description proceeds, are attained by this signaling system for automotive vehicles, a preferred embodiment of which has been illustrated in the accompanying drawings, for way of example only, wherein:

Figure 3 is a top plan view of the signal lamps mounting as shown in Figures 1 and 2, and being enlarged to show the parts thereof in greatest detail;

Figure 4 is a vertical sectional view as taken along the line 4—4 of Figure 3;

Figure 5 is a plan view of the circuit closing mechanism used in conjunction with the present invention;

Figure 6 is a horizontal sectional view as taken along the line 6—6 of Figure 7;

Figure 7 is a vertical sectional view as taken along the longitudinal axis of the device as shown in Figure 5;

Figure 8 is a vertical sectional view as taken along the line 8—8 in Figure 6;

Figure 9 is a vertical sectional view as taken along the line 9—9 in Figure 6;

Figure 1:
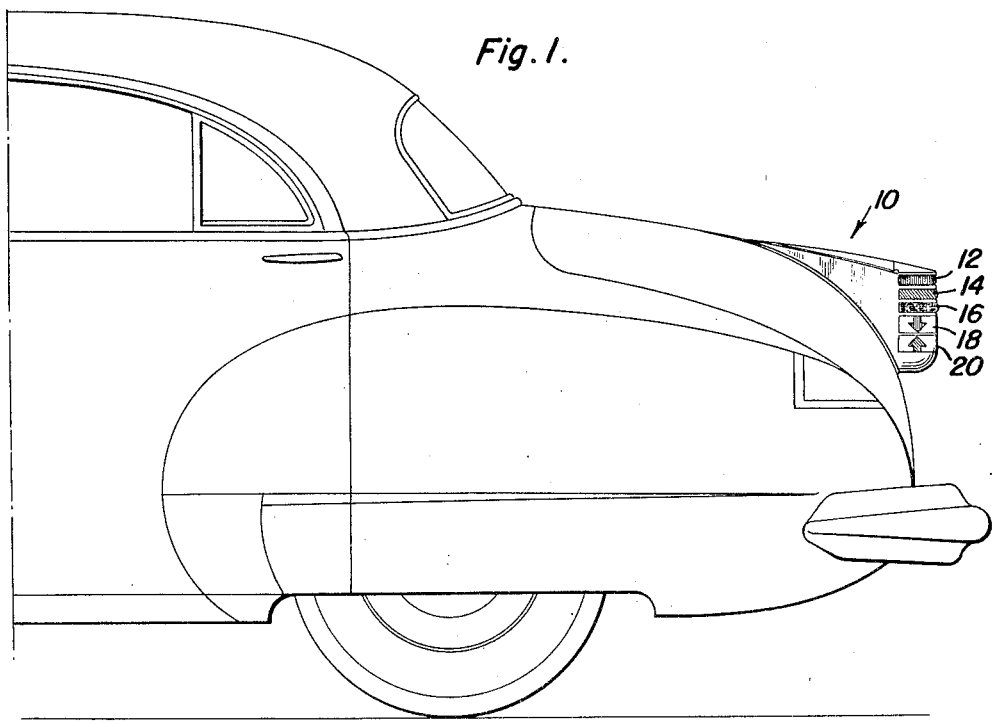
Figures 1 and 2 are side elevational views showing the manner in which the signal lamps are emplaced upon an automobile.
Figure 2:
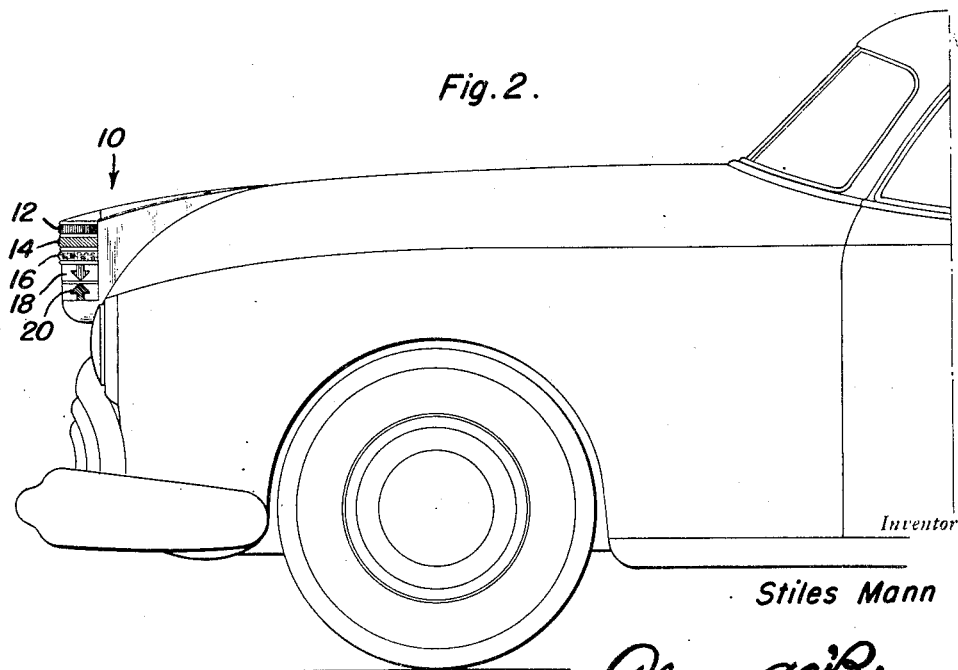
Figure 10:
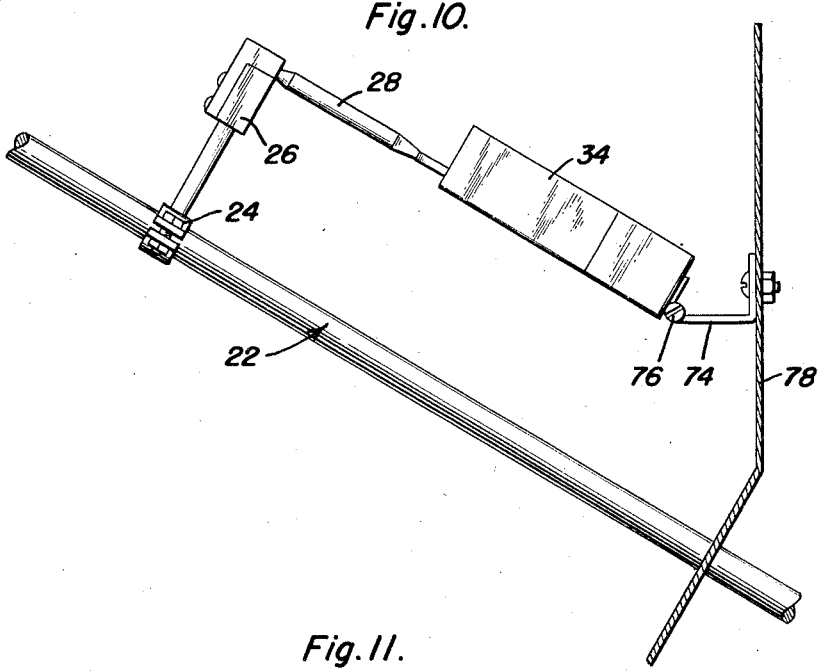
Figure 10 is a side elevational view of the circuit closing mechanism as shown in operative emplacement on the gear shift lever of an automobile.

With continuing reference to the accompanying drawings, wherein like reference numerals designate similar parts throughout the various views, attention is directed first to Figures 1 and 2 wherein is shown and generally designated by reference numeral 10 a cluster of signal lamps which are operatively connected in the unique manner to be henceforth disclosed which comprises the present invention.

The signal system makes the use of a group of five lights of three different colors which are formed in the cluster 10. The three upper lights of the group indicate the use of the gears and the brakes of the automobile and lower lights of the group are directional indicators for right and left turns.

The lights indicating the use of the gears and the brakes are automatically controlled by means of switches attached to the shifting mechanism of the automobile and to the brakes, whereas the directional indicators are manually operated.

It is preferred to form the top lamp 12 red, the second lamp 14 yellow and the third lamp 16 green. These lamps indicate the position of the gear shift lever and whether the brake is on or off. Directly below these lamps are the directional signal lamps 18 and 20, the left turn signal being red and the right turn signal being green. The reason for this arrangement is that there is greater danger to be encountered in turning left across traffic lanes than in making a right turn. Through this arrangement the operation of the vehicle can be determined and interpreted on sight by an approaching motorist.

Referring now to Figures 5 through 10 wherein it is shown in detail the circuit closing mechanism for the lamps 12 through 20 in the cluster 10, reference numeral 22 generally designates a gear shift lever. Encompassing the gear shift lever at a selected position is a clamp 24 to which is rigidly secured a suitable housing 26 in which a rod 28 has a ball 30 there emplaced. The rod 28 is formed with a thickened portion 32 at its other end which is slidably emplaced within a housing 34. Pivotally connected to the thickened portion of the rod 28 is a substantially U-shaped plate 36 which is also slidable within the housing 34. Additionally, opposed pairs of plates 38 and 40, and 42 and 44 are pivotally connected by means of pins 46 and 48 to the thickened portion 32 of the rod 28. Between each of the pairs of plates 38 and 40, and 42 and 44 are rotatably mounted or journaled pairs of rollers 50 and 52 and 54 and 56, respectively.

Pivotally connected to the U-shaped plate 36 is a contact arm 58 which is engaged between rollers 52 and 54 in spaced relation to the rod 28. The contact arm is formed with a portion of reduced area which is adapted to be engaged by the rollers 52 and 54 as is best shown in Figure 6. The downwardly extending end of the contact arm 58 is provided with a contact lug 60 of an electrically conductive substance. Preferably the arm 58 together with the other elements of the circuit closing mechanism are formed from an insulative plastic material, preferably of thermoplastic characteristics such as "Bakelite" though other material may readily be used. The electrically conductive contact lug 60 is thusly adapted to close a circuit between contacts 62, 64, 66, and 68 and a ground plate 70 which is suitably grounded as desired. The contacts 62, 64, 66 and 68 are provided with suitable and conventional threaded terminals 72 to which conductors which are adapted to be connected to the lamps in the cluster 10 are operatively connected.

Figure 11:
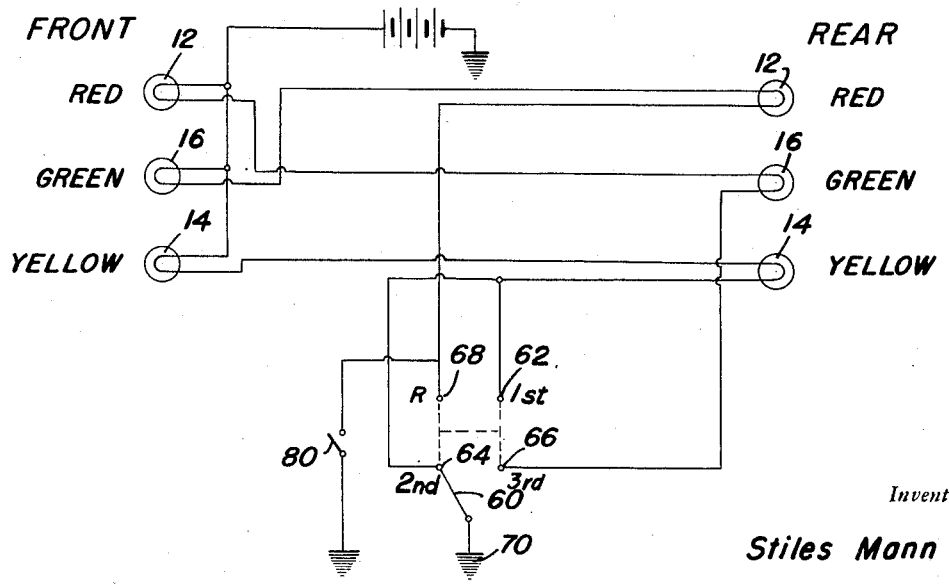
Figure 11 is a circuit diagram showing how the signal lamps are operatively connected to a source of power.

The housing 34 is secured by means of brackets 74 and the pivotal connection 76 to the wall 78 of the conventional automobile. It can be readily understood that when the gear shift lever 22 is pulled back into either the second or third speed position the contact lug 60 will contact either of the contacts 62 or 66 depending on whether the gear shift lever is in the second or third speed position. Furthermore, the contact lug 60 will contact the contact 64 or 68 when the gear shift lever is in the first speed or reverse position. This is because while the contact arm 58 always remains in a longitudinally spaced relation with the rod 28, upon rotation of the rod 28 in one direction the rollers 52 and 54 together with the guiding rollers 50 and 56 cause the contact arm 58 to rotate in a direction opposed to the direction of rotation of the rod 26. Hence, in passenger type motor vehicles the common way of shifting gears is accomplished by a manual operated lever whose action forms the letter H with the horizontal line between the vertical lines being the neutral position of the lever. This H can be readily seen upon inspection of Figure 11.

When the automobile is in reverse gear, the red light 12 of the rear cluster will be "on" and the green light 16 of the front will be "on." The same lights will also be actuated when the brake is depressed and the hydraulically operated switch 80 of conventional design is closed. When the vehicle is in first or second gear, the yellow light will be "on" in both front and rear. When the automobile is in third or high gear, the red light is "on" in front and the green light is "on" in the rear. Thusly, all the operations of the gear lever and the brakes become readily apparent to an approaching motorist, whether approaching from the rear or the front of a vehicle. Thus is provided a signal system for automotive vehicles that is highly efficient in operation and will tend to decrease the number of accidents due to human error on the highways.

Since from the foregoing, the construction and advantages of this signal system for automotive vehicles are readily apparent, further description is believed to be unnecessary.

However, since numerous modifications will readily occur to those skilled in the art after a consideration of the foregoing specification and accompanying drawings, it is not intended to limit the invention to the embodiment shown and described, but all suitable modifications and equivalents may be resorted to which fall within the scope of the appended claims.

Having described the invention, what is claimed as new is:

1. A gear shift lever actuated circuit closing mechanism comprising a rod adapted to be connected at one end to a gear shift lever, the other end of said rod being slidably mounted in a housing, a contact arm slidably mounted in said housing, means pivotally secured to said rod engaging said contact arm for holding said arm in spaced relationship to said rod and for rotation of said contact arm in the opposite direction to the rotation of said rod, a plurality of contacts secured in said housing, said contact arm selectively contacting one of said contacts upon selective actuation of said rod.

2. A gear shift lever actuated circuit closing mechanism comprising a rod adapted to be connected at one end to a gear shift lever, the other end of said rod being slidably mounted in a housing, a contact arm slidably mounted in said housing, means pivotally secured to said rod engaging said contact arm for holding said arm in spaced relationship to said rod and for rotation of said contact arm in the opposite direction to the rotation of said rod, said means comprising plates pivotally secured to said rod, rollers secured to said plates, said rollers abutting said contact arm.

3. A gear shift lever actuated circuit closing mechanism comprising a rod adapted to be connected at one end to a gear shift lever, the other end of said rod being slidably mounted in a housing, a contact arm slidably mounted in said housing, means pivotally secured to said rod engaging said contact arm for holding said arm in spaced relationship to said rod and for rotation of said contact arm in the opposite direction to the rotation of said rod, said means comprising plates pivotally secured to said rod, rollers secured to said plates, said rollers abutting said contact arm, a plurality of contacts secured in said housing, said contact arm selectively contacting one of said contacts upon selective actuation of said rod.

4. A gear shift lever actuated circuit closing mechanism comprising a rod adapted to be connected at one end to a gear shift lever, the other end of said rod terminating in a position of greater cross sectional area and being slidably mounted in a housing, a contact arm slidably mounted in said housing, means pivotally secured to said rod engaging said contact arm for holding said arm in spaced relationship to said rod and for rotation of said contact arm in the opposite direction to the rotation of said rod, said means comprising opposed pairs of plates pivotally secured to said thickened portion of said rod, rollers secured between said plates, said rollers abutting said contact arm.

5. A gear shift lever actuated circuit closing mechanism comprising a rod adapted to be connected at one end to a gear shift lever, the other end of said rod terminating in a position of greater cross sectional area and being slidably mounted in a housing, a contact arm slidably mounted in said housing, means pivotally secured to said rod engaging said contact arm for holding said arm in spaced relationship to said rod and for rotation of said contact arm in the opposite direction to the rotation of said rod, said means comprising opposed pairs of plates pivotally secured to said thickened portion of said rod, rollers secured between said plates, said rollers abutting said contact arm, a plurality of contacts secured in said housing, said contact arm selectively contacting one of said contacts upon selective actuation of said rod.

STILES MANN.

REFERENCES CITED

The following references are of record in the file of this patent:

UNITED STATES PATENTS

| Number | Name | Date |
|---|---|---|
| 579,268 | Harthan | Mar. 23, 1897 |
| 1,394,046 | Swaney | Oct. 18, 1921 |
| 1,469,337 | Sanborn | Oct. 2, 1923 |
| 1,919,206 | Douglas | July 25, 1933 |